United States Patent

Nagata

[11] Patent Number: 5,978,765
[45] Date of Patent: Nov. 2, 1999

[54] VOICE GENERATION CONTROL APPARATUS

[75] Inventor: Naoyuki Nagata, Tenri, Japan

[73] Assignee: Sharp Kabushiki Kaisha, Osaka, Japan

[21] Appl. No.: 08/696,741

[22] Filed: Aug. 14, 1996

[30] Foreign Application Priority Data

Dec. 25, 1995 [JP] Japan ................................ 7-336693

[51] Int. Cl.⁶ .................................................. G10L 5/02
[52] U.S. Cl. ........................ 704/358; 704/270; 704/225
[58] Field of Search ................................ 704/201, 203, 704/211, 214; 369/48; 368/63

[56] References Cited

U.S. PATENT DOCUMENTS

| | | | |
|---|---|---|---|
| 4,717,261 | 1/1988 | Kita et al. ............................. | 368/63 |
| 4,764,966 | 8/1988 | Einkauf et al. ....................... | 395/2.37 |
| 4,868,653 | 9/1989 | Golin et al. .......................... | 348/390 |
| 4,918,523 | 4/1990 | Simon et al. ......................... | 348/396 |
| 5,218,640 | 6/1993 | Morio et al. .......................... | 395/2.1 |
| 5,225,904 | 7/1993 | Golin et al. .......................... | 348/410 |
| 5,267,245 | 11/1993 | Maruyama ............................ | 370/109 |
| 5,278,944 | 1/1994 | Sasaki et al. ......................... | 395/2.21 |
| 5,412,719 | 5/1995 | Hammamoto et al. ............... | 380/9 |
| 5,513,268 | 4/1996 | Bironas et al. ....................... | 381/109 |
| 5,668,916 | 9/1997 | Fujinama ............................. | 386/47 |

FOREIGN PATENT DOCUMENTS 6325587  11/1994  Japan .

Primary Examiner—David R. Hudspeth
Assistant Examiner—Michael N. Opsasnick

[57] ABSTRACT

A voice generation control apparatus includes a one-bit voice flag, a voice start address register used for temporarily saving a voice start address, and a terminator detector for detecting a terminator in a voice data memory. Voice generation is started when the voice flag is set, while voice generation is terminated when the voice flag is reset upon an output of a terminator from the voice data memory. As a result, the voice generation is smoothly started and terminated by a simple system and simple operations.

6 Claims, 4 Drawing Sheets

VOICE GENERATION CONTROL APPARATUS

FIELD OF THE INVENTION

The present invention relates to a voice generation control apparatus which has voice data in a memory such as ROM (read only memory) and RAM (random access memory), and smoothly starts or stops the generation of voice in an integrated device wherein a voice generation function is included in a microcomputer, or a device having the voice generation function separately from the microcomputer.

BACKGROUND OF THE INVENTION

In general, in order to generate voice, head sections of a plurality of predetermined voice information are successively reproduced, and address control and access to a memory are performed through a control circuit.

For example, such a device is disclosed in Japanese Publication for Unexamined Patent Application No. (Tokukaihei) 6-325587. In an information reproducing apparatus disclosed in the above publication, a plurality of voice data are recorded in a memory and operation-start positional information of each voice data is recorded in an index section. Moreover, a main control circuit controls an address control circuit to read out the operation-start positional information and specific positional information of each voice phrase from the memory. Thereafter, the contents of recording recorded in a position between the respective positional information are reproduced successively with respect to each voice data. Namely, in this structure, each phrase is selected by the main control circuit instead of allocating voice data to be written or setting a voice start address.

Therefore, it is necessary for the main control circuit to observe the entire operations from the start of voice generation until the voice generation is stopped, resulting in a complicated and expensive circuit. In addition, in this structure, it is impossible to directly start or stop the voice generation by directly specifying a voice start address through a peripheral or an external CPU (central processing unit). Moreover, it is difficult to add new voice data to the memory, or reproduce voice from the middle of a phrase by a simple control.

One example of the integrated structure where the voice generation function is included in the microcomputer is a voice generation chip. The voice generation chip reproduces voice by turning on a port determined every other phrase. This structure is advantageous in terms of cost. However, it is also difficult to start the voice generation from the middle of a phrase, or continuously reproduce more than one phrase in a smooth manner.

Moreover, it is impossible to perform fine and stable control with a simple system having a small number of ports if the voice generation function is independent of the main CPU. Additionally, the start and stop of the voice generation cannot be smoothly controlled through the external CPU and other devices. It is thus difficult to continuously generate voice from different phrases, and continuously generate voice during reproduction of another voice. Here, the structure in which the voice generation function is independent of the main CPU refers a structure in which the voice generation function is used as an internal peripheral circuit formed as a single chip, or a structure in which the voice generation function is used as a voice generation device.

Regarding a method of stopping the generation of voice, one method records a code representing the data length of voice data in advance, and detects a time at which the voice generation stops by reading out the code at the start of the voice data. In this case, a down counter or an address comparator is separately required to judge whether an address containing voice stop data is accessed before a voice address pointer reaches the final address of the data. When a judgment is made using the down counter, since it is necessary to decode the number of steps of voice data to be reproduced from a code representing the number of voice steps in the voice data into the form of the down counter, a decoder for detecting the count of the step number is further required.

In order to avoid the use of the down counter and the decoder for the step number counter, the following method may be employed. In this method, a one-bit flag is allocated for each step, and the generation of voice is stopped when the control circuit reads out the flag. In this case, although the circuit structure is simplified, a memory having a bit capacity corresponding to the addresses of voice data is separately required, resulting in an increase in the cost.

SUMMARY OF THE INVENTION

It is an object of the present invention to provide a voice generation control apparatus capable of controlling the start and termination of voice generation in a stable manner with a simple circuit structure.

In order to achieve the above object, a voice generation control apparatus of the present invention includes:

a voice data memory for storing a plurality of voice data containing an ending code;

a voice address pointer for specifying an address in the voice data memory;

a voice flag which is set when outputting voice, and is reset when terminating the outputting of voice;

a voice start address register for containing data specifying a voice start address;

means for transferring the contents of the voice start address register to the voice address pointer, and causing the voice address pointer to start counting up when the voice flag is set;

means for resetting the voice flag when the ending code is read out from the voice data memory; and means for stopping the voice address pointer counting when the ending code is read out or when the voice flag is reset.

In this structure, when reproducing voice from voice data, the data is set in the voice start address register in advance, and a voice generation state is achieved by making the voice flag ON (set) The contents of the voice start address register are copied to the voice address pointer when the voice flag changes from OFF (reset) to ON at the start of voice generation, and reproduction of voice is started by using the contents as the voice start address.

When the voice address pointer passes an ending code in the voice data and the ending code is output, the voice generation is automatically stopped, and simultaneously the voice flag is for ced to be OFF.

In this case, in order to force the voice generation to stop during the voice generation, it is necessary to force the voice flag to be OFF by a microcomputer or a peripheral circuit. On the other hand, when starting generation of voice during generation of another voice, it is necessary to newly write data of a voice start address in the voice start address register and cause the voice flag to be ON to start the voice generation.

Thus, the voice start address register uses the contents thereof as the voice address pointer, the contents become unnecessary after the voice generation is started. It is therefore possible to use the voice start address register as an ordinary general purpose register until the start of next voice generation.

Moreover, it is possible to control switching of the status between the voice generation state and the voice generation termination state by changing the voice flag between ON and OFF upon an instruction from the microcomputer, and is also possible to interrupt the voice generation by forcing the voice flag to be OFF during the voice generation. As a result, smooth start and termination of voice generation can be easily achieved by controlling a small number of ports.

For a fuller understanding of the nature and advantages of the invention, reference should be made to the ensuing detailed description taken in conjunction with the accompanying drawings.

DESCRIPTION OF THE PREFERRED EMBODIMENTS

The following description will discuss one embodiment of the present invention with reference to FIGS. 1 to 4. A voice generation control apparatus of this embodiment controls 5-bit 64K(FFFFH)-step voice data with an 8-bit microcomputer.

Figure 1:
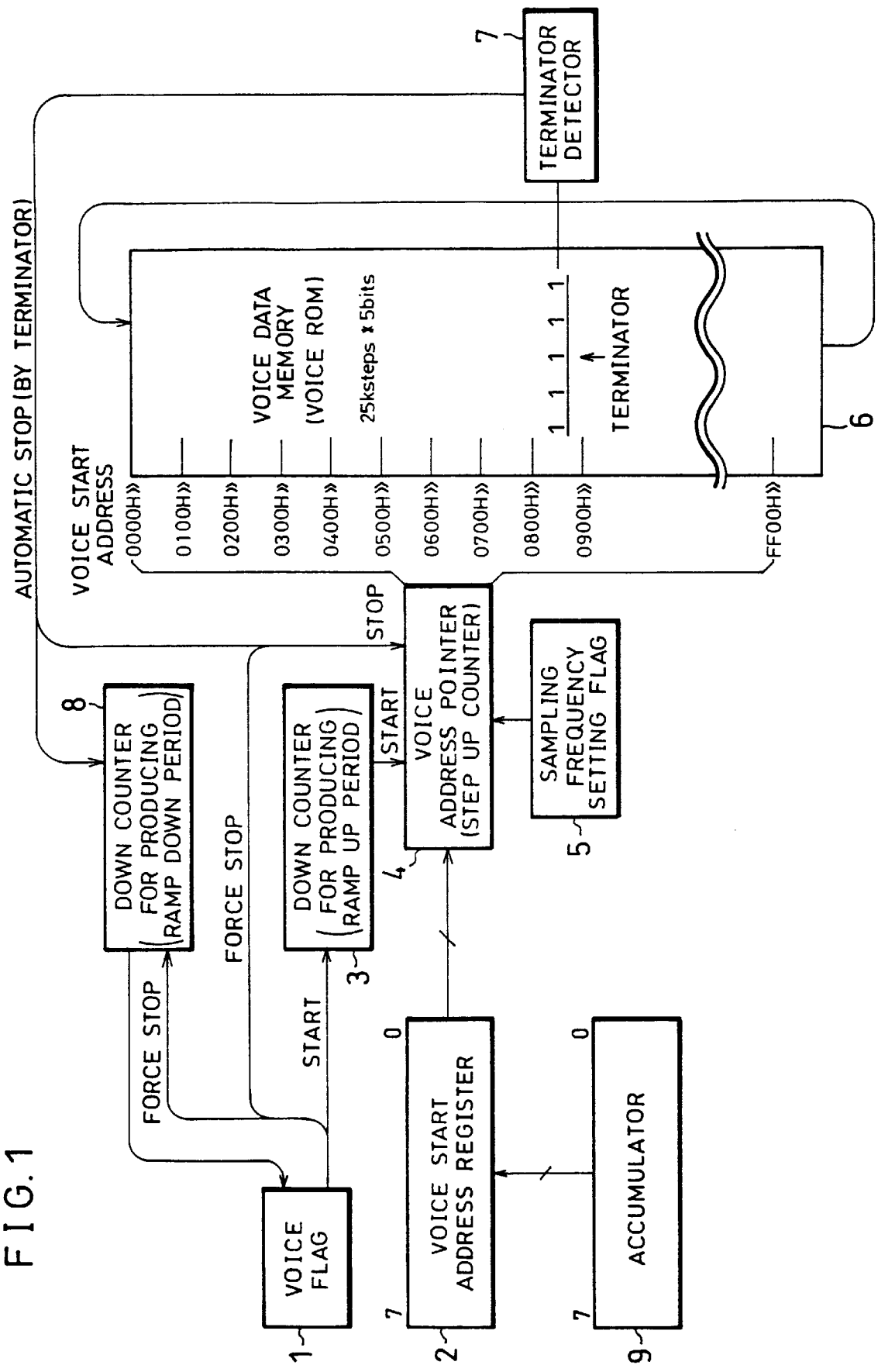
FIG. 1 is a block diagram showing an example of system structure of a voice generation control apparatus according to one embodiment of the present invention.

FIG. 1 shows an example of the system structure of the voice generation control apparatus of the present invention. The voice generation control apparatus includes a voice flag 1, a voice start address register 2, a down counter 3, a voice address pointer 4, a sampling frequency setting flag 5, a voice data memory 6, a terminator detector 7, a down counter 8, and an accumulator 9.

The voice flag 1 is a one-bit flag to start and stop the voice generation, and is forced to be set (ON) and reset (OFF) by an instruction from the microcomputer. In this embodiment, the voice generation is started when the voice flag 1 is ON, while the voice generation is stopped when the voice flag 1 is OFF. The voice flag 1 also performs its original function as a status flag register to indicate a voice generation state when it is ON, and indicate a voice generation termination state when it is OFF. Moreover, the voice flag 1 enables monitoring whether the reproduction of voice is being carried out or is stopped through an external device. More specifically, in order to arrange the microcomputer to know whether the voice generation is being carried out or stopped, the status of the voice flag 1 is sent to the accumulator 9 upon an instruction from the microcomputer.

The voice start address register 2 is used for specifying a voice start address at which voice data starts, and temporarily save the voice start address.

The voice address pointer 4 fetches the contents of the voice start address register 2 when the voice flag 1 changes from OFF to ON, i.e., from the voice generation termination state to the voice generation state, and traces the addresses of the voice data. In this embodiment, the voice address pointer 4 is formed by a step up counter, and counts up in a manner synchronous with a sampling frequency of voice data. If the maximum number of steps of voice addresses is 0FFFFH (H representing a hexadecimal digit) and the intervals between voice start addresses are 100H, respectively, the maximum value of the voice start address is 0FF00H.

Figure 2:
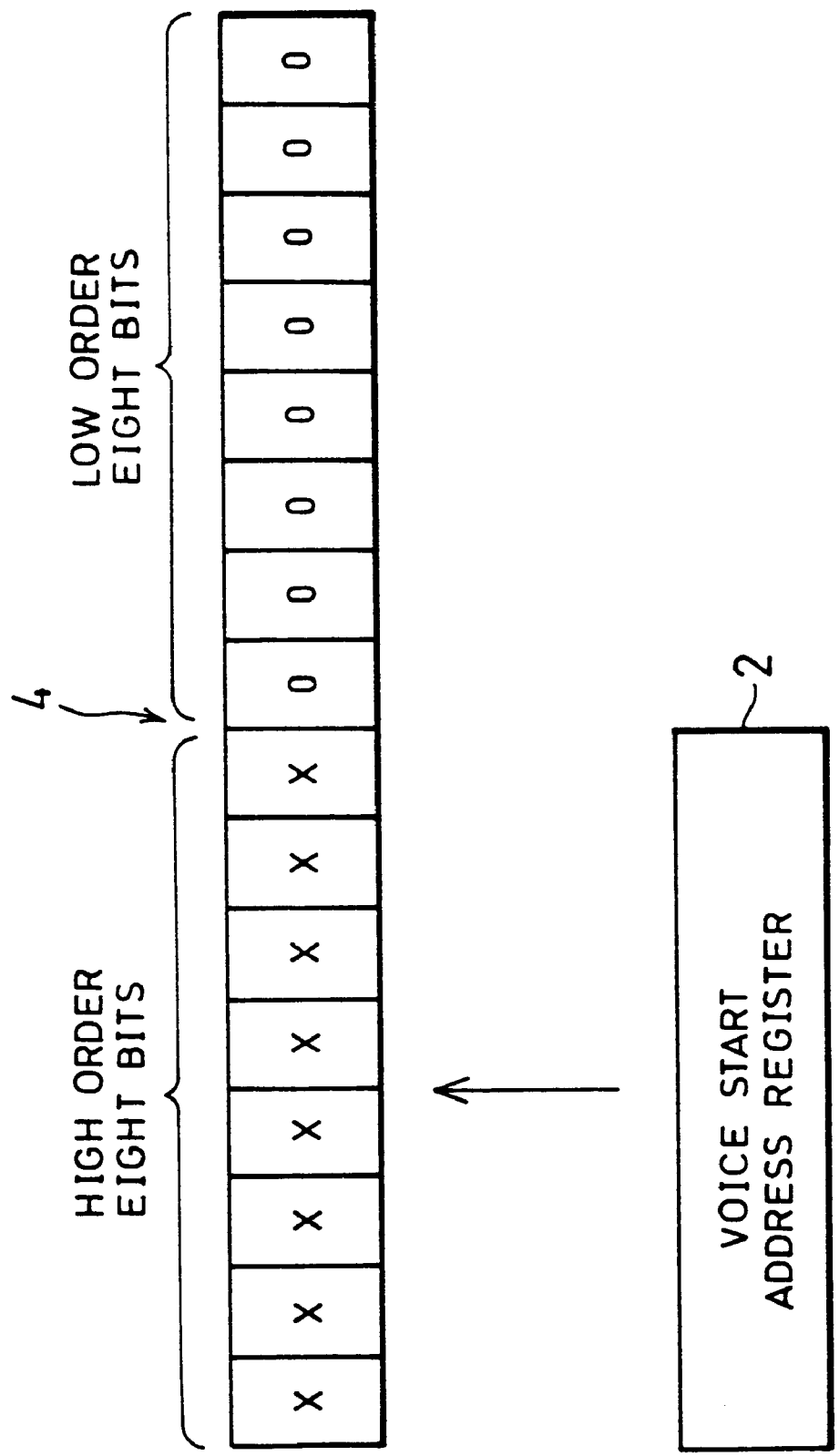
FIG. 2 is a view showing an example of the structure of a voice address pointer.

FIG. 2 shows an example of the structure of the voice address pointer 4. The contents of high order eight bits are transferred from the voice start address register 2 to the voice address pointer 4. The low order eight bits are fixed at zero. In FIG. 2, "X" represents zero or one.

As illustrated in FIG. 1, the sampling frequency setting flag 5 sets a trace rate of the voice address pointer 4 in reproducing voice by setting a sampling frequency of voice data.

The voice data memory 6 is formed by ROM or RAM, and stores voice data containing a terminator (ending code). The voice data memory 6 of this embodiment is formed by a voice ROM.

The data of the terminator is always special data fixed, and is allocated to the end of voice data. When the voice address pointer 4 reaches the terminator, the voice flag 1 is forced to be OFF, and simultaneously the voice generation is stopped.

In this case, when producing voice data by sampling analog signals to be a source of the voice data, it is necessary to prevent the voice generation from being terminated, i.e., data of the terminator from being output, during the voice reproduction. In order to facilitate the production of voice data, it is easy and suitable to use the maximum value or the minimum value of the voice data as the terminator data. For example, if the voice data is 5-bit data like this embodiment, 11111B (B representing a binary digit) is used as the terminator. Thus, by setting the terminator to the maximum value, all data can be used as voice data without interrupting data between 00000B to 11110B, thereby facilitating the production of voice data and decoding in reproducing voice.

The terminator detector 7 detects the terminator in the voice data. Namely, the terminator detector 7 judges whether the voice address pointer 4 reaches the terminator.

The accumulator 9 is an accumulator in the 8-bit microcomputer, and judges whether or not the voice generation is being carried out by monitoring the state of the voice flag 1.

The down counter 3 produces a ramp up period which begins when voice output becomes zero and ends when the voice output reaches an offset value so as to reduce pop noise at the start of voice generation.

The down counter 8 produces a ramp down period which begins from the offset value of voice output and ends when the voice output reaches zero so as to reduce pop noise at the stop of voice generation.

As described above, when the ramp up period and the ramp down period are provided, a delay must be introduced before a voice generation circuit (not shown) as the voice generation function performs its operation after an alternation in the status of the voice flag 1. In this case, the down counters 3 and 8 are delayed so that the voice flag 1 is changed from ON to OFF.

In this structure, the contents of the voice start address are transferred from the accumulator 9 to the voice start address register 2. Moreover, the sampling frequency setting flag 5 is arranged to set a trace rate of the voice address pointer 4 in reproducing voice.

Next, when the voice flag 1 is changed from OFF to ON, the contents of the voice start address register 2 are fetched in the voice address pointer 4, and simultaneously the down counter 3 starts counting. In order to reduce pop noise which is generated at the start of voice generation, the voice address pointer 4 remains stopped until the contents of the down counter 3 change from FFH to 00H. When the down counter 3 reaches 00H, the voice address pointer 4 starts to count up at a specified sampling frequency. The voice address pointer 4 traces the addresses in the voice data memory 6 containing the voice data.

Since the voice data memory 6 holds a terminator to terminate the reproduction of voice, when the voice address pointer 4 reaches the terminator, the terminator detector 7 detects the terminator, and the voice address pointer 4 is stopped to count up. After waiting the down counter 8 to reach 00H, the voice flag 1 is made OFF.

Figure 3:
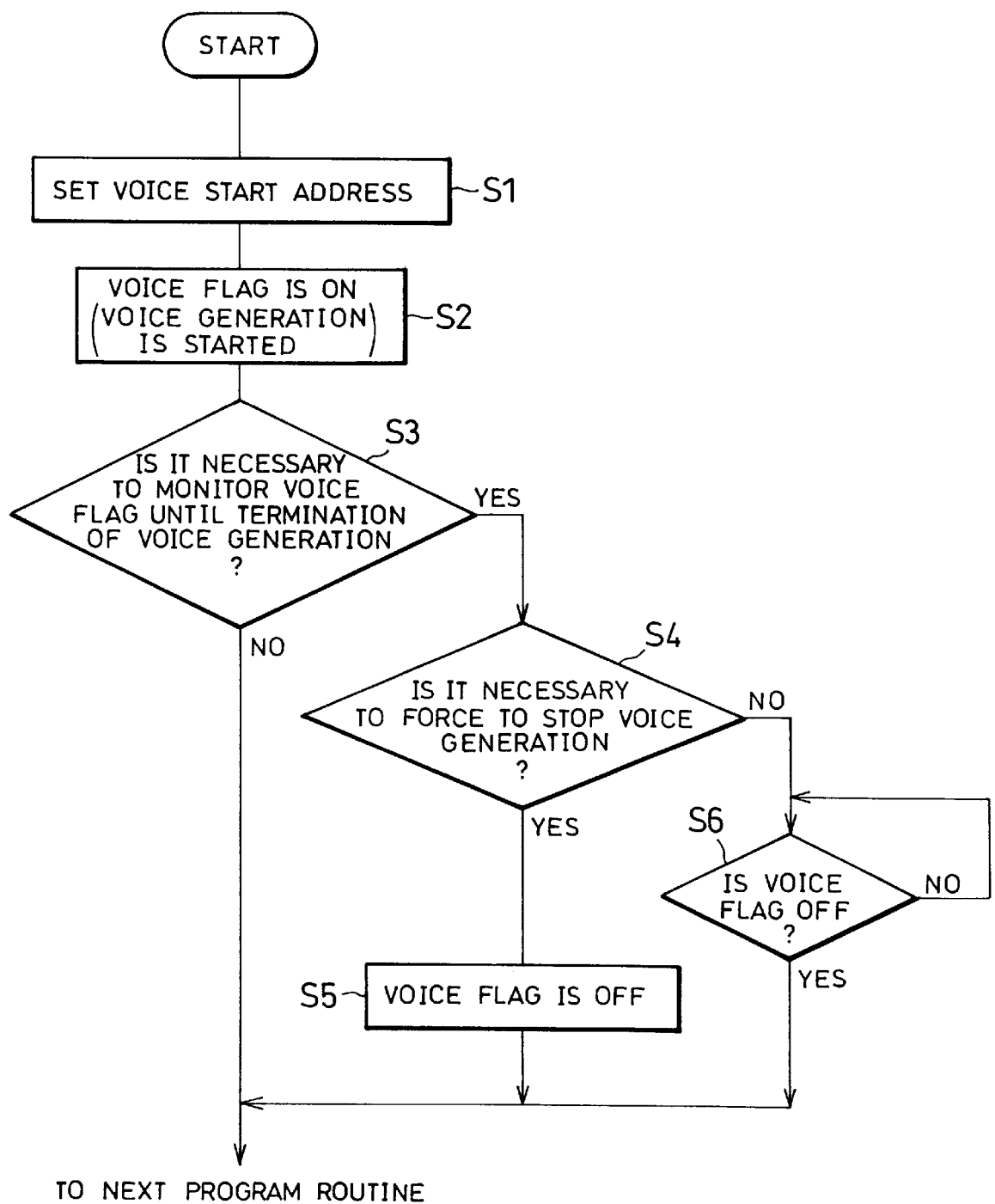
FIG. 3 is a flow chart showing a program in the voice generation control apparatus.

FIG. 3 is a flow chart of a voice generation program in the system structure shown in FIG. 1.

When reproducing voice from voice data, data are set in the voice start address register 2 beforehand, and the voice flag 1 is made ON by an instruction code of the microcomputer to start voice generation. The contents of the voice start address register 2 are copied to the voice address pointer 4 only when the voice flag 1 is changed from OFF to ON at the start of voice generation, and the voice reproduction is started by using the contents as the voice start address (steps S1 and S2).

In step S3, whether it is necessary to monitor the voice flag 1 until the voice generation is terminated is judged. If no, this program is skipped, and the next program routine is started. On the other hand, if the monitoring is judged necessary, a judgement is made as to whether it is necessary to force to terminate the voice generation in step S4.

If the forced termination of the voice generation is not required at step S4, tracing of addresses is performed it step S6 until the voice address pointer 4 reaches the terminator and the voice flag 1 becomes OFF. More specifically, when the voice address pointer 4 passes the terminator in the voice data, the generation of voice is automatically stopped, and simultaneously the voice flag 1 is forced to be OFF.

On the other hand, when the voice generation is forced to be stopped at step S4, the voice flag 1 is forced to be OFF by the microcomputer or a peripheral circuit (step S5). At this time, if the voice generation circuit and the main body of the microcomputer are separate circuits, it is not necessary for the microcomputer to directly control the generation of voice.

When starting the generation of voice during generation of another voice, the generation of voice is started by newly writing data of a voice start address in the voice start address register 2, and then changing the voice flag 1 to ON.

As described above, the voice generation control apparatus of this embodiment includes the voice data memory 6 for storing a plurality of voice data containing a terminator, the voice address pointer 4 for specifying an address in the voice data memory 6, the one-bit voice flag 1 which is set when outputting voice and reset when terminating the outputting of voice, and the voice start address register 2 for storing data specifying a voice start address. Moreover, when the voice flag 1 is set, the contents of the voice start address register 2 are transferred to the voice address pointer 4, and the voice address pointer 4 starts to count up. When the terminator is read out from the voice data memory 6, the voice flag 1 is reset, and the voice address pointer 4 is stopped to count up in respond to the readout of the terminator or the reset of the voice flag 1.

At this time, since the voice data of the terminator can never change, it is necessary for the terminator detector 7 to only judge whether a stream of data are in correspondence. Thus, complicated address decoder and comparator are not required. More specifically, in the voice generation control apparatus of this embodiment, since the terminator in the voice data is monitored by a hardware, it is possible to achieve a simple structure in which the voice generation circuit is stopped and the voice flag 1 is forced to be OFF simultaneously. Therefore, even when the voice generation is being carried, the CPU can perform another task.

The voice start address register 2 for temporarily saving the voice start address uses the contents of the voice start address register 2 as the voice address pointer 4 when the voice flag 1 changes from OFF to ON, i.e., in synchronous with a change in the status from the voice generation termination state to the voice generation state. Therefore, the contents of the voice start address register 2 are not required at all after the start of voice reproduction, and the voice start address register 2 can be used as a general purpose register until the next voice reproduction is started.

Moreover, it is possible to control the status to change between the voice generation state and the voice generation termination state by changing the one-bit voice flag 1 to be ON or OFF upon an instruction from the microcomputer. Furthermore, the voice generation can be interrupted by forcing the voice flag 1 to be OFF during the voice generation. It is thus possible to easily achieve smooth start and stop of voice generation by controlling a small number of ports.

In addition, since the voice address pointer 4 is directly set by the voice start address register 2, the voice address pointer 4 can be moved to a midway of voice data, thereby allowing voice reproduction from the middle of the voice data. For example, when voice data "thank you very much" are contained, if the voice reproduction is performed by setting the voice address pointer 4 to a portion next to "thank you", the "very much" portion is partially reproduced.

Moreover, since a sampling frequency for reproduction can be selected by the sampling frequency setting flag 5, it is possible to hold data of different sampling frequencies in one memory, thereby allowing more effective use of the memory.

Furthermore, by fixing the low order eight bits of the voice address pointer 4 at zero, the setting of voice start addresses can be simplified. As a result, the amount of data (the number of bits) from the voice start address register 2 can be reduced to a minimum, thereby decreasing the number of bus lines. In this case, since a reduced amount of data is transferred to the voice address pointer 4 from the voice start address register 2 in starting the voice generation, it is possible to decrease the number of ports of the voice start address register 2. Consequently, the voice address pointer 4 can be set finely by a simple control.

In other words, in general, if fine setting of the voice start address is made available, the setting of the voice address register becomes complicated. In this embodiment, however, the number of bits of the voice start address register 2 is reduced and the low order bits of the voice start address are fixed at zero to effectively use the high order bits of the voice start address as data, thereby allowing fine setting of the voice start address with a simple structure. Consequently, the control method of the data transfer is simplified, and an increase in the number of ports necessary for controlling the start of voice generation is prevented. As a result, since the circuit structure is simplified, control can be performed easily. This contributes to a reduction in the chip size and cost.

Additionally, when the voice address pointer 4 is arranged to be finely set, even if there are a large number of short voice data, the short voice data can be accurately packed into the voice data memory 6, thereby achieving an effective use of the voice data memory 6 for storing voice data.

Moreover, since the voice start address is finely set, care must be taken to the total volume of voice data stored in the voice data memory 6 rather than to the volume of individual voice data in producing voice data. Consequently, the voice data can be produced more easily.

Thus, in the structure of the voice generation control apparatus of this embodiment, with the use of the voice flag 1, the voice generation and the termination of voice generation can be smoothly controlled by a simple system using a small number of ports and by simple operations. As a result, the voice memory and the CPU can be used effectively, and a higher degree of freedom is achieved in use.

Figure 4:
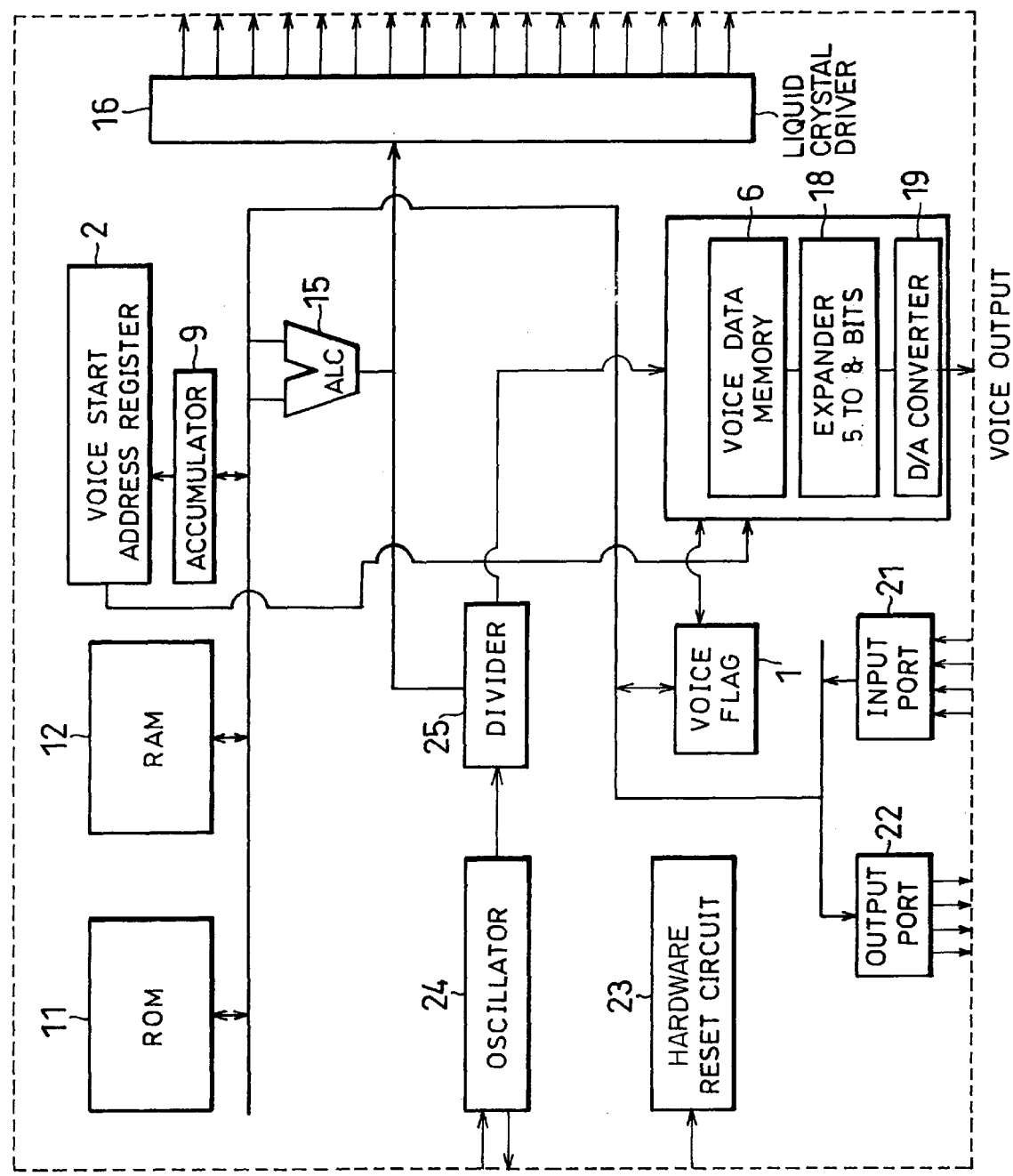
FIG. 4 is a block diagram showing an example of a product produced by applying the voice generation control apparatus to a single chip microcomputer having a voice generation function.

FIG. 4 shows an example of a product produced by applying the voice generation control apparatus to a single-chip microcomputer having a voice generation function.

The microcomputer includes a ROM 11, a RAM 12, an ALU (logic unit) 15, a liquid crystal driver 16, an expander 18, a D/A converter 19, an input port 21, an output port 22, a hardware reset circuit 23, an oscillator 24, a divider (frequency devider) 25, and the voice generation control apparatus. For the sake of simplifying drawing the voice generation control apparatus, only the voice flag 1, the voice start address register 2, the voice data memory 6, and the accumulator 9 are shown in the voice generation control apparatus of FIG. 4.

Here, a clock generated by the oscillator 24 is sent to the divider 25, and the resultant clock is used in a system clock of the microcomputer, a voice generation circuit and a liquid crystal display. Moreover, the program of the microcomputer is stored in the ROM 11. A key matrix is arranged by the output port 22 and the input port 21, and the start or stop of voice generation, the type of voice, etc. are selected depending on the contents input through a keyboard.

In this structure, the contents input by the keyboard are transferred to the RAM 12 as a data memory, and the ALU 15 decides a voice start address in the voice data memory 6 based on the contents, and data corresponding to the address is transferred to the voice start address register 2 from the accumulator 9. By making the voice flag 1 ON according to the information from the accumulator 9, the outputting of voice is started.

In this case, since compressed voice data and an ending code (terminator) of voice generation are contained in the voice data memory 6, when the compressed voice data are expanded from five bits to eight bits by the expander 18 on the basis of the data and then undergo the D/A converter 19, a voice output is obtained.

When the terminator in the voice data memory 6 is accessed, the voice flag 1 becomes OFF, and the outputting of voice is stopped. The ALU 15 judges whether the outputting of voice is being performed or stopped by monitoring the voice flag 1. Therefore, if an input instructing the stop of the voice generation is entered from the keyboard, the ALU 15 recognizes the input and makes the voice flag 1 OFF to stop the voice generation.

It is also possible to switch the liquid crystal display between ON and OFF or interconnect the start and stop of the voice generation with the displayed contents according to the contents of the program in the ROM 11.

In this embodiment, the voice generation control apparatus is used in a system in which 5-bit 64K(FFFFH)-step voice data are controlled by an 8-bit microcomputer. However, in order to achieve the object of the present invention, it is also possible to use the voice generation control apparatus in any other methods as long as these methods allow specifying the voice address pointer 4 to trace the voice data by the voice flag 1, initiating and terminating voice generation by the voice flag 1, and confirming the status by the voice flag 1.

Furthermore, the above-mentioned voice generation control apparatus can be used for devices incorporating a voice guiding function and sound effects, such as electronic dictionary having a voice generation function, a compact liquid crystal game machines, clocks, and desktop electronic calculators, or devices requiring control of sound effects and a voice generation circuit which does not require high precision.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A voice generation control apparatus comprising:
   a voice data memory for storing a plurality of voice data containing an ending code;
   a voice address pointer for specifying an address in said voice data memory;
   a voice flag which is set when outputting voice, and is reset when terminating the outputting of voice;
   a voice start address register for temporarily storing data specifying a voice start address only before a transfer of the data to said voice address pointer;
   means for transferring contents of said voice start address register to said voice address pointer and causing said voice address pointer to start counting up when said voice flag is set;
   means for resetting said voice flag when said ending code is read out from said voice data memory;
   means for stopping said voice address pointer counting when said ending code is read out or when said voice flag is reset;
   wherein said voice start address is formed by a high order portion and a low order portion, said low order portion being fixed; and
   only data indicating said high order portion are saved in said voice start address register, and said data are transferred to said voice address pointer so as to set a voice start address in said voice address pointer, so that the voiced data generates voice.

2. A voice generation control apparatus comprising:
   a voice data memory for storing a plurality of voice data containing an ending code;
   a voice address pointer for specifying an address in said voice data memory;
   a voice flag which is set when outputting voice, and is reset when terminating the outputting of voice;
   a voice start address register for temporarily storing data specifying a voice start address only before a transfer of the data to said voice address pointer;

means for transferring contents of said voice start address register to said voice address pointer and causing said voice address pointer to start counting up when said voice flag is set;

means for resetting said voice flag when said ending code is read out from said voice data memory;

means for stopping said voice address pointer counting when said ending code is read out or when said voice flag is reset; and further comprising a sampling frequency setting flag for setting a sampling frequency used for reproducing voice, so that the voiced data generates voice.

3. The voice generation control apparatus according to claim 1, wherein said ending code is a maximum value or minimum value of a voice data, so that the voiced data generates voice.

4. A voice generation control apparatus comprising:

a voice data memory for storing a plurality of voice data containing an ending code;

a voice address pointer for specifying an address in said voice data memory;

a voice flag which is set when outputting voice, and is reset when terminating the outputting of voice;

a voice start address register for temporarily storing data specifying a voice start address only before a transfer of the data to said voice address pointer;

means for transferring contents of said voice start address register to said voice address pointer and causing said voice address pointer to start counting up when said voice flag is set;

means for resetting said voice flag when said ending code is read out from said voice data memory; and means for stopping said voice address pointer counting when said ending code is read out or when said voice flag is reset;

wherein generation of voice during generation of another voice is started by newly writing data indicating a voice start address in said voice start address register and setting said voice flag, so that the voiced data generates voice.

5. A voice generation control apparatus comprising:

a voice data memory for storing a plurality of voice data containing an ending code;

a voice address pointer for specifying an address in said voice data memory;

a voice flag which is set when outputting voice, and is reset when terminating the outputting of voice;

a voice start address register for temporarily storing data specifying a voice start address only before a transfer of the data to said voice address pointer;

means for transferring contents of said voice start address register to said voice address pointer and causing said voice address pointer to start counting up when said voice flag is set;

means for resetting said voice flag when said ending code is read out from said voice data memory;

means for stopping said voice address pointer counting when said ending code is read out or when said voice flag is reset; and further comprising a down counter for producing a ramp up period when starting voice generation and producing a ramp down period when stopping voice generation, so that pop noise is reduced, so that the voiced data generates voice.

6. A voice generation control apparatus comprising:

a voice data memory for storing a plurality of voice data containing an ending code;

a voice address pointer for specifying an address in said voice data memory;

a voice flag which is set when outputting voice, and is reset when terminating the outputting of voice;

a voice start address register for temporarily storing data specifying a voice start address only before a transfer of the data to said voice address pointer;

means for transferring contents of said voice start address register to said voice address pointer and causing said voice address pointer to start counting up when said voice flag is set;

means for resetting said voice flag when said ending code is read out from said voice data memory;

means for stopping said voice address pointer counting when said ending code is read out or when said voice flag is reset; and further comprising a down counter for producing a ramp down period when stopping voice generation which begins from an offset value of voice output and ends when the voice, output reaches zero and for producing a ramp up period when starting voice generation, so that pop noise is reduced, so that the voiced data generates voice.

* * * * *